Figure 1:
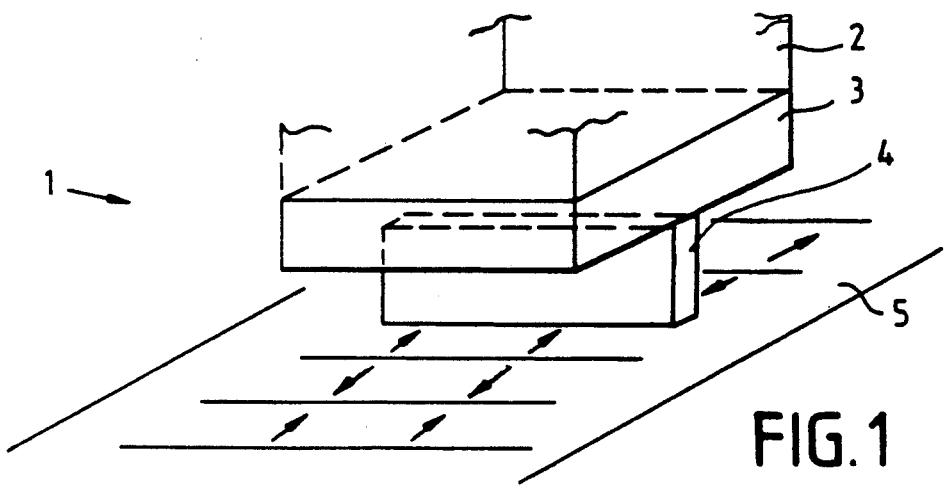

United States Patent

Colineau et al.

[11] Patent Number: 5,227,938
[45] Date of Patent: Jul. 13, 1993

[54] HIGH RESOLUTION MAGNETO-OPTIC READ HEAD

[75] Inventors: Joseph Colineau, Bures sur Yvette; Sophie Neubert, Les Ulis, both of France

[73] Assignee: Thomson-CSF, Puteaux, France

[21] Appl. No.: 675,912

[22] PCT Filed: Oct. 3, 1990

[86] PCT No.: PCT/FR90/00703
§ 371 Date: May 2, 1991
§ 102(e) Date: May 2, 1991

[87] PCT Pub. No.: WO91/05345
PCT Pub. Date: Apr. 18, 1991

[30] Foreign Application Priority Data

Oct. 3, 1989 [FR] France .................. 89 12895

[51] Int. Cl.⁵ .............................. G11B 5/127
[52] U.S. Cl. ............................... 360/114
[58] Field of Search ........................ 360/114

[56] References Cited

U.S. PATENT DOCUMENTS 4,618,901 10/1986 Hatakeyama et al. .
4,677,513 6/1987 Naito et al. .
4,707,755 11/1987 Ohta ............................ 360/114

FOREIGN PATENT DOCUMENTS 0233086 8/1987 European Pat. Off. .
2605783 4/1988 France .
2120001 11/1983 United Kingdom .

OTHER PUBLICATIONS

Patent Abstracts of Japan, vol. 12, No. 34 (P-662) (2881), Feb. 2, 1988 & JP, A, 62185267 (Hitachi) Aug. 13, 1987.

Primary Examiner—A. J. Heinz
Attorney, Agent, or Firm—Oblon, Spivak, McClelland, Maier & Neustadt

[57] ABSTRACT

The magnetic head of the invention is composed of several micro-heads each of which comprises, on a substrate (2'), a garnet (3') and two pole pieces (7, 8) separated by a narrow air-gap (9).

14 Claims, 5 Drawing Sheets

FIG.8a  FIG.8b  FIG.8c
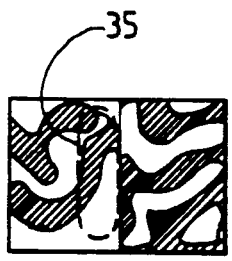
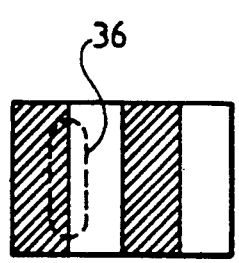
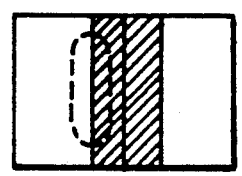
FIG.8d  FIG.8e  FIG.8f
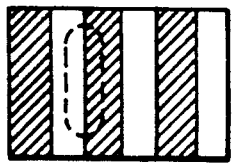
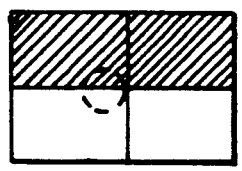
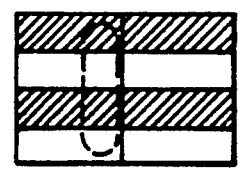

HIGH RESOLUTION MAGNETO-OPTIC READ HEAD

BACKGROUND OF THE INVENTION

1. Field of the Invention

The present invention relates to a high resolution magneto-optic read head.

2. Discussion of the Background

The magneto-optic reading of magnetic tapes or disks using the Faraday effect in a ferrimagnetic garnet placed in contact or close to the magnetic medium is known for example from publications by T. NOMURA (NHK Company). Such a reading mode gives good performance with regard to the minimum detectable signal level (when its amplitude is close to the average amplitude of the noise), in particular for recording on narrow tracks. On the other hand, this reading mode has a rather low resolution, limited both by the resolution of the optical system and by the spatial band (natural dimensions of the domains) of the garnet. It is thus difficult to read signals having wavelengths of less than one micrometer, whereas present-day magnetic tapes allow the recording of signals having wavelengths of 0.5 micrometer or less.

T. NOMURA has described a solution associating with the garnet used as a magneto-optic transducer a magnetic structure providing coupling with the magnetic tape. This structure is a pole piece having microscopic dimensions (thickness 0.6 $\mu$m, track width 15 $\mu$m, height 25 $\mu$m) applied and stuck to the garnet.

It would be possible to consider the use of magneto-optic transducers for the reading of high density multi-track magnetic recordings, but the major problem which arises then is cross talk between tracks. T. NOMURA's present device would not allow such a multi-track device to be produced because of the high track-to-track permeance exhibited by the pole piece. It would be necessary to divide up this pole piece which would present very large production problems.

SUMMARY OF THE INVENTION

The subject of the present invention is a magneto-optical read head which can advantageously be a multi-track read head, which is easy to produce, has the lowest possible cost price and which has both a high resolution and the lowest possible cross talk if it is a multi-track head.

The magneto-optic read head according to the invention comprises at least one micro-head formed on a substrate, this micro-head comprising a magneto-optic transducer and at least two pole pieces made of magnetic material separated by a narrow air-gap. Preferably, the transducer and the pole pieces are formed using the thin-layer technique. Advantageously, it is possible to modify locally the magnetic properties of the pole pieces, for example by modifying their geometry and/or their composition. It is possible, also advantageously, to apply to the magneto-optic transducer a variable magnetic or electromagnetic field.

According to an advantageous variant of the invention, the material of the magneto-optic transducer exhibits an oblique anisotropy and is monodomain over at least one of the pole pieces.

Figure 2:
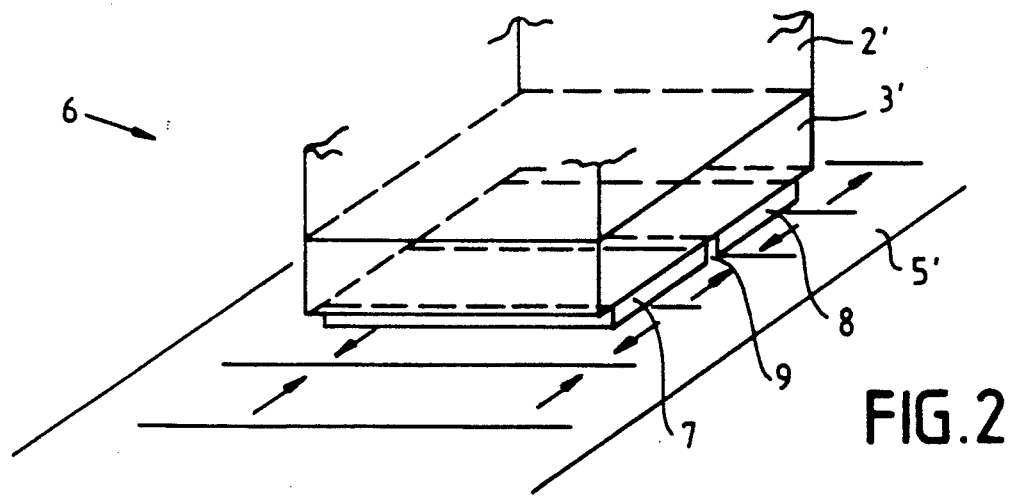
Figure 2A:
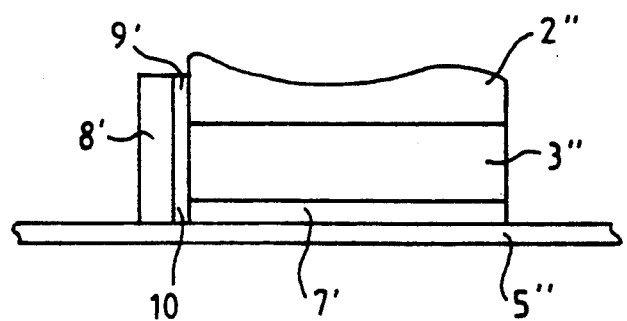
Figure 3:
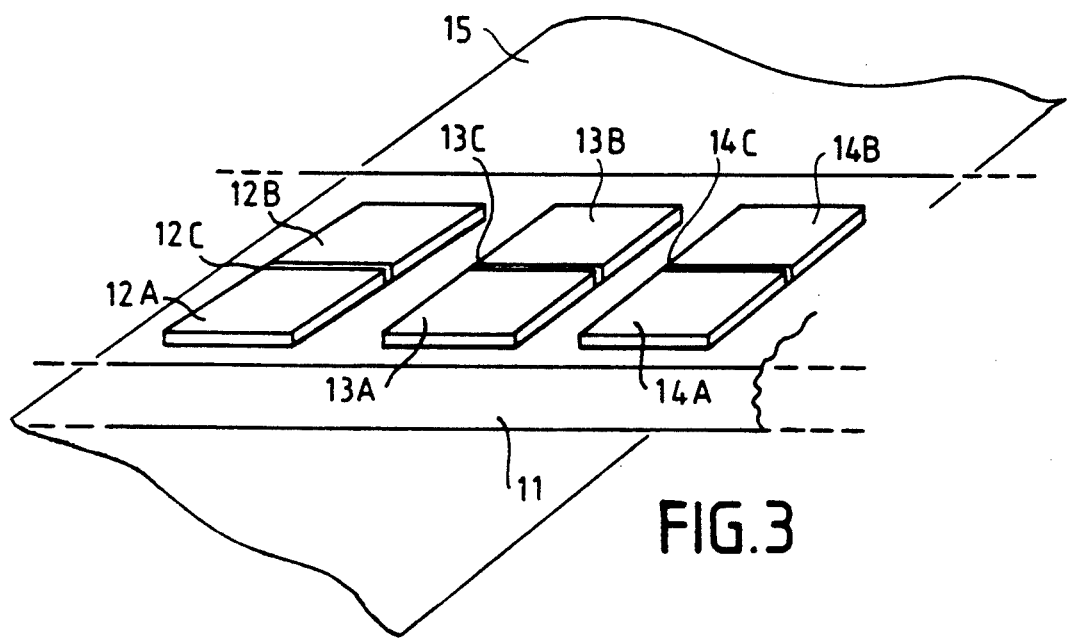
Figure 4:
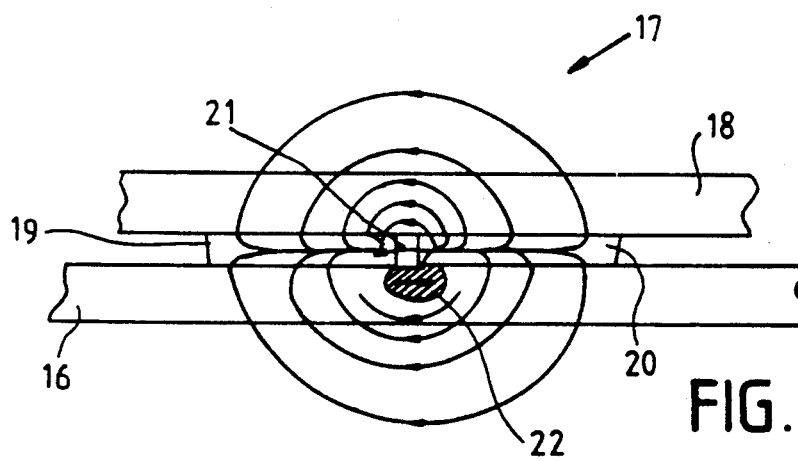
Figure 5:
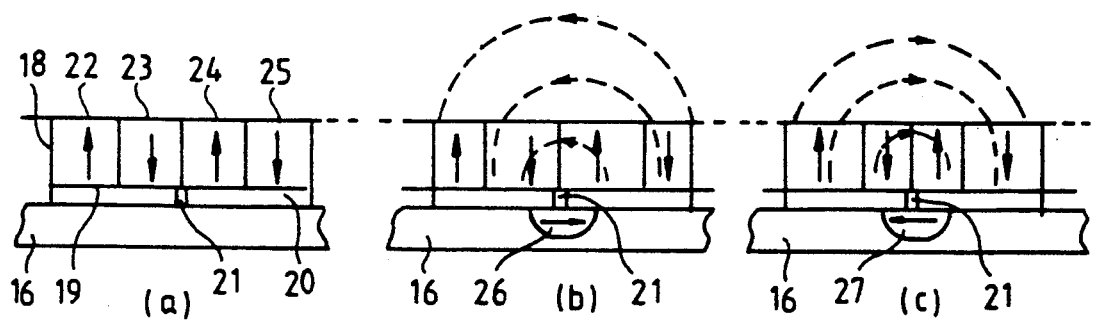
Figure 6:
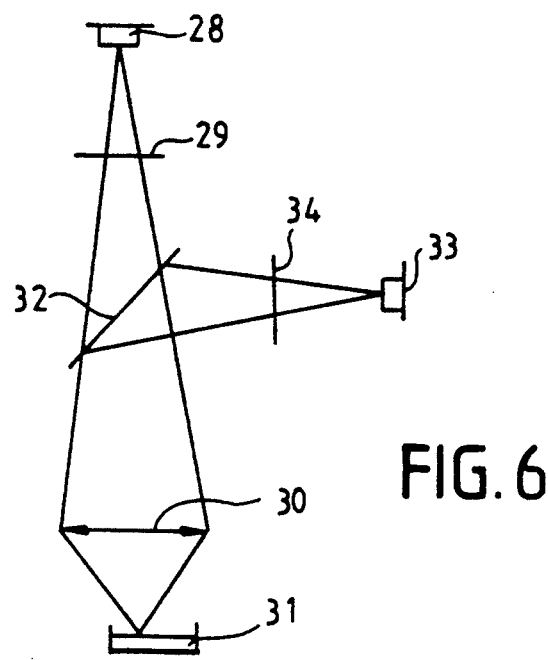
Figure 7A:
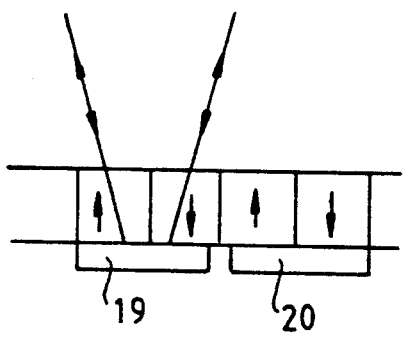
Figure 7B:
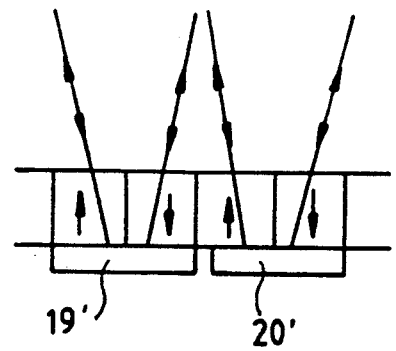
Figure 7C:
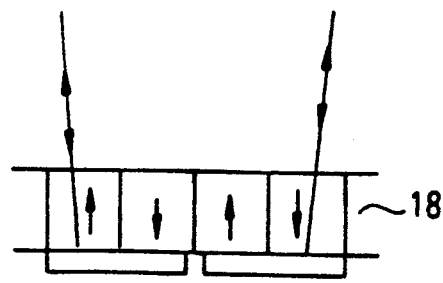
Figure 9:
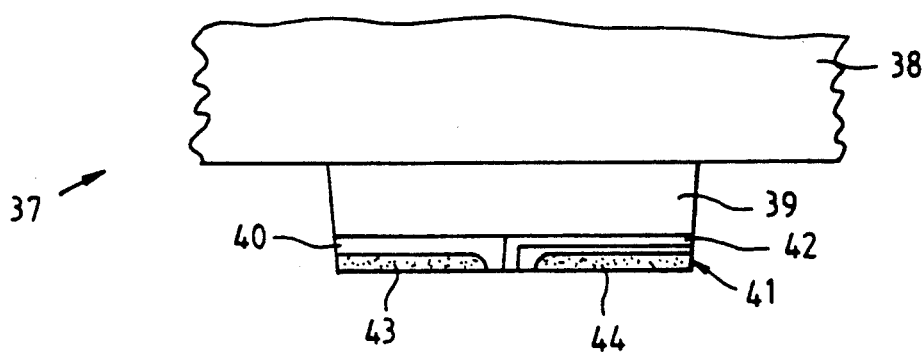
Figure 10A:
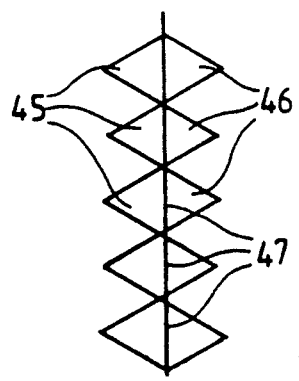
Figure 10B:
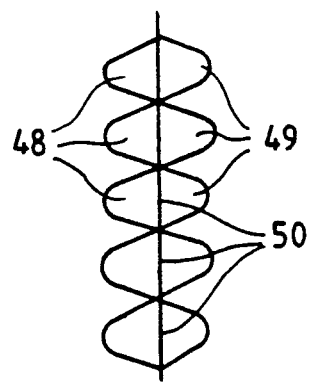
Figure 10C:
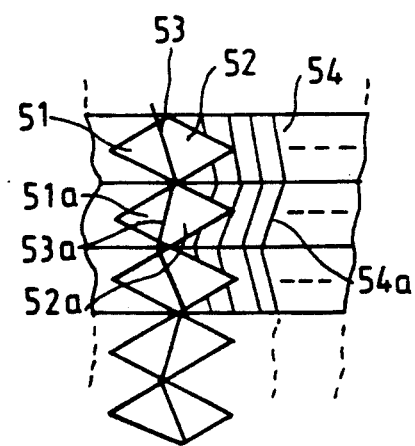

The present invention will be better understood on reading the detailed description of several embodiments, taken by way of non-limitative examples and illustrated by the appended drawing in which:

FIG. 1 is a simplified perspective view of a magneto-optic read head of the prior art, FIGS. 2 and 2A are respectively a simplified perspective view of a magneto-optic read head according to the invention and a simplified cross-sectional view of a variant of the head according to the invention, FIG. 3 is a simplified partial view of an embodiment of a magneto-optic read head according to the invention, FIG. 4 is a diagrammatic cross-sectional view of a read head according to the invention showing field lines which it generates, FIG. 5 is a set of diagrammatic cross-sectional views of a read head according to the invention, showing the displacement of the boundaries of the domains of the magneto-optic transducer under the effect of the field generated by a magnetic dipole, FIG. 6 is a simplified diagram of an embodiment of a magneto-optic read system comprising a read head according to the invention, FIGS. 7a, 7b and 7c are a set of diagrammatic cross-sectional views showing various read modes which can be implemented with a read head according to the invention, FIGS. 8a, 8b, 8c, 8d, 8e, and 8f are a set of diagrammatic views showing various possible configurations of the domains of the transducer of a read head according to the invention, FIG. 9 is a diagrammatic cross-sectional view of a practical embodiment in thin layers of a read head according to the invention, and FIGS. 10a, 10b, and 10c are a set of simplified plan views of poles of a multi-track read head according to the invention.

The magneto-optic read head 1 shown in FIG. 1 has been described in articles by T. NOMURA as mentioned above. This known head comprises, on a substrate 2, a layer 3 of ferromagnetic garnet. A pole piece 4 of rectangular parallelepipedic shape and made from magnetic material is applied or stuck to the garnet 3. The pole piece 4 is disposed in the middle of the length of the layer of garnet 3, parallel to its short sides. The long sides of the pole piece 4 are perpendicular to the direction of movement of the magnetic medium 5, which is for example a magnetic tape. The tape 5 is in contact with the face of the piece 4 which is opposite its face fixed to the garnet 3.

The magnetic head 6 according to the invention (FIG. 2) comprises, like the head 1, a substrate 2' and a layer of garnet 3'. On the other hand, the interface of the head 6, between the magnetic medium 5' and the garnet 3', is completely different from that of the head 1. This interface comprises two pole pieces 7, 8 which are separated by a narrow air-gap 9. For the embodiment shown in FIG. 2, the pole pieces 7, 8 are in the form of very thin rectangular parallelepipeds (a thickness of a few micrometers for example) both formed on the same face (the one facing the tape 5') of the layer 3'. As described below, with reference to FIG. 10, these pole pieces can have other shapes. Furthermore, the number of these pole pieces can be greater than two. According to another embodiment, shown in FIG. 2A, one of the pole pieces 7' is formed on the large free face of the layer of garnet 3" (itself formed on a substrate 2") of which it occupies almost the entire area, whereas the other pole piece, referenced 8', is formed on a non-magnetic layer 9' which is itself very thin and is formed on a common side face of the layers 2'', 3'' and 7' (a face which will be oriented perpendicular to the direction of movement of the tape 5''). The layers 8' and 9' are disposed in such a way as to practically completely cover the side face of the layer 7', which causes the obtaining, between the pole pieces 7' and 8', of an air-gap 10 filled by the material of the layer 9'.

According to a variant, which is not shown, it is possible to form, for the same head, more than two pole pieces, for example four, whose air-gaps are for example perpendicular to each other.

The resolution of the magnetic head according to the invention is related, as in a conventional magnetic head, to the width of the air-gap and its sensitivity depends in particular on the portion of the flux generated by the magnetic tape which interacts with the magneto-optic layer (3' or 3'').

FIG. 3 shows a multi-track embodiment of the magnetic head according to the invention. In this embodiment, the pole pieces are reproduced periodically on the surface of the garnet, for example in line.

FIG. 3 shows only the layer of garnet 11 and the pairs of pole pieces 12A and 12B, 13A and 13B, 14A and 14B . . . , whose respective air-gaps 12C, 13C, 14C are aligned in a direction perpendicular to the direction of movement of the magnetic tape 15.

The functioning of the head according to the invention will now be described with reference to FIGS. 4 to 8.

FIG. 4 shows the distribution of the magnetic flux created by the magnetic tape 16 in a magneto-optic read head 17. For this head 17, there has been shown only the layer of garnet 18 and the pole pieces 19, 20 with their air-gap 21.

During its passage under the air-gap 21, a magnetic dipole 22 of the tap 16 imposes a magnetic potential difference between its two poles, which creates an approximately cylindrical field distribution in the vicinity of the air-gap 21. The perpendicular component of the field passing through the thin layer of magneto-optic garnet 18 interacts with the magnetic domains of the garnet and modifies their disposition and/or their respective areas.

FIG. 5 shows this interaction in the particular case in which four magnetic domains 22 to 25 of the garnet 18 are aligned in the direction of movement of the magnetic tape 16. The domains 22 and 23 are covered by the pole piece 19, and the domains 24 and 25 are covered by the pole piece 20. In this structure, the edges of the pole pieces, 19, 20 and the air-gap 21 determine the position of the corresponding boundaries of the domains, and only the median boundaries located at the level of the centres of the pole pieces (boundaries between domains 22 and 23 and between domains 24, 25) move under the effect of the field generated by the magnetic tape 16. The passage under the air-gap 21 of a magnetic dipole results in a movement of median boundaries, a movement whose direction depends on the polarity of the dipole. View a of FIG. 5 shows the domains in the rest state. View b of FIG. 5b relates to the case in which a dipole 26 passing under the air-gap 21 has its south pole on the side of the pole piece 19 and its north pole on the side of the pole piece 20. The domains 23 and 24 then have a tendency to widen at the expense of the domains 22 and 25 respectively.

View c of FIG. 5 relates to the opposite case, that is to say the case in which a dipole 27, passing under the air-gap 21, has a polarity which is the reverse of that of the dipole 26 in view b. In this case, the domains 22 and 25 have a tendency to widen at the expense of the domains 23, 24.

The movement of the boundaries separating the domains 22, 23 and 24, 25 can be measured using an optical system similar to that of a magneto-optic disk read head and shown diagrammatically in FIG. 6. As this system is well known per se, it will only be described briefly here. This system essentially comprises a laser diode light source 28, whose light beam passes through a polariser 29 and a lens 30 which concentrates it on one of the mobile boundaries of the garnet 31 of a read head according to the invention (not shown). The beam reflected by the garnet passes through the lens 30 and is deflected by a beam separator 32, disposed between the lens 30 and the polariser 32, towards a photo-diode analysing device 33 via a filter 34.

According to a first embodiment shown in FIG. 7a, the beam focused by the lens 30 on the garnet 31 is projected in the direction of one of the two pole pieces, for example the pole piece 19. According to a second embodiment shown in FIG. 7b, a beam is projected in the direction of each of the pole pieces 19', 20' and a differential measuring system is produced, of which the details of embodiment are obvious to those skilled in the art. According to a third embodiment shown in FIG. 7c a single beam is projected on the whole of the garnet 18, and the diffraction pattern produced by all of the domains of this garnet is used. The details of embodiment of such a system are also obvious to those skilled in the art.

The functioning of the read head according to the invention has been described above in the case of a structure of garnet having four domains, which does not always occur in reality. In practice, the organisation of the magnetic domains of a garnet can assume various forms which can also be used for the read head of the invention. A maze-type arrangement, as shown in view a of FIG. 8, is often encountered. It is the configuration naturally assumed by the magnetic domains of the garnet in the absence of external constraint. In this case, the spot of the beam of the read head measures the relative area variation of the magnetic domains oriented in two directions which are generally perpendicular to each other. The flux density generated by the magnetic tape in the garnet being highest in the proximity of the air-gap, the spot 35 is preferably of a substantially rectangular shape and parallel to the air-gap (view a, FIG. 8).

If the domains of the garnet are, as shown in views b to d of FIG. 8, in the form of strips parallel to the air-gap (3 or more strips), the read spot 36 is preferably of substantially rectangular and elongated shape, parallel to the air-gap, which minimises the noise related to parasitic boundary movements.

If as shown in views e and f of FIG. 8, the domains of the garnet are perpendicular to the air-gap, their structure comprising at least two strips, the spot is focused as close as possible to the air-gap, since it is there that the displacement of the boundaries has the greatest amplitude.

FIG. 9 shows a practical embodiment of a read head according to the invention. The head 37 comprises a substrate 38, for example made of GGG (Gadolinium, Gallium, Garnet). There is formed on the substrate 38, by epitaxial growth in liquid phase, a thin magneto-optic layer 39, for example a garnet of rare earths and iron doped with Bismuth or with Cerium. On the layer 39 are then formed the pole pieces 40, 41 and the air-gap 42 according to the planar technique for producing magnetic heads in thin layers such as described in French Patent Application 86 14974. The pole pieces 40, 41, are advantageously made from Sendust and the air-gap 42 from alumina. Such a process is particularly suited to the production of multi-track heads since it allows the collective manufacture of a large number of micro-heads which are perfectly positioned with respect to each other, the geometric accuracy being that of the etching mask of the pole pieces.

In order to eliminate any possibility of direct coupling of the garnet and the magnetic tape away from the poles, which would result in the reading of parasitic signals, it is preferably to etch the thin layer of garnet 39 during the same process as that allowing the etching of the pole pieces. Advantageously, the pole pieces 40, 41 can be thinned in their sections distant from the air-gap 42, the missing magnetic material being replaced by a non-magnetic material 43, 44, in order to keep flat the faces of these pole pieces which are intended to be in contact with the magnetic tape to be read.

According to one example of embodiment of the head of FIG. 9, its typical dimensions are approximately as follows:

thickness of the layer of garnet 39: 2 μm
thickness of the pole pieces 40, 41 (in Sendust for example): 1 μm
width of the air-gap: 0.25 μm
dimensions of the micro-head (at the level of the garnet 39): 20 μm × 20 μm The shape of the pole pieces 40, 41 depends on a certain number of factors:
the efficiency of the flux transfer from the tape to the garnet 39 (approximately 20% of the magnetic flux created by the tape serves to displace the boundaries of the domains of the garnet)
desired geometry of the domains,
presence or non-presence of an azimuth
minimisation of the "psuedo-gap" effect (phantom air-gap) at the edges of the pole pieces opposite the air-gap 42
minimisation of cross-talk in multi-track structures.

In order to take account of these factors, it is possible, advantageously, to modify locally the magnetic properties of the pole pieces for example by modifying their shapes (shapes other than the rectangular shape) as described below with reference to FIG. 10.

Furthermore, it is possible, advantageously, to apply a variable magnetic or electromagnetic field to the garnet in order to make the non-fixed boundaries undergo high-amplitude displacements which are modulated by the magnitude to be read.

FIG. 10 shows three examples of shapes of pole pieces appropriate for multi-track heads. At (a), the pole pieces 45, 46 are in the shape of isosceles triangles. For each micro-head, these triangles have their bases facing each other, the air-gap 47 being formed between these bases. The air-gaps of the different micro-heads are aligned.

At (b) there have been shown pole pieces 48, 49 having a shape close to that of the pieces 45, 46 but whose edges other than the base are rounded and can exhibit a contour substantially in the shape of half of a sinusoid. The air-gap 50 is formed between the facing bases of the pole pieces 48, 49. The air-gaps of the different micro-heads are aligned.

At (c) the pole pieces 51, 52, 51a, 52a... are of triangular shape but not isosceles. Their respective air-gaps 53, 53a... are not aligned and form a jagged line allowing azimuthal variation (tracks 54, 54a... of the magnetic tape not aligned, allowing an improvement in the cross talk between adjacent tracks).

The magneto-optic transducer can also operate in another mode: if use is made of a magneto-optic material in a thin layer having oblique anisotropy, as for example Yttrium and undoped iron garnet, where the magnetization is oriented at 45° from the normal to the layer, it is possible to observe the variation of this angle under the effect of the flux supplied by the tape. It is possible to make the angle of anisotropy between the normal to the layer and a line parallel to the layer vary by varying the doping of the garnet. The Faraday rotation which the analysing light beam undergoes is proportional to the component of the magnetization along the axis of propagation of the beam. It will therefore be modulated at the rate of the information recorded on the tape.

In this operating mode, it is preferable to make the material monodomain over each of the two pole pieces or over the whole of the device. This can be achieved by a judicious choice of the dimensions of the poles and of the thickness of the layer or of the nature of the material or by applying a uniform field to the whole of the device.

The reading beam of the transducer is projected according to one of FIGS. 7(a) to 7(c), according to the extent of the monodomain. In the case in which the monodomain extends over an area approximately equal to the area occupied by the two pole pieces, it is advantageous to focus the reading beam close to the middle of this monodomain, at the level of the air-gap.

We claim:

1. A high resolution magneto-optic read head, comprising:
a substrate comprising a magneto-optic transducer material, said magneto-optic transducer material having a first major flat surface which is substantially parallel to a magnetic media;
a first set of first and second pole pieces comprising magnetic material, the first pole piece of the first set disposed on a first region of said first major flat surface, the second pole piece of the first set disposed on a second region of said first major flat surface, wherein said second region is distinct from said first region, and an edge of each of the first and second pole pieces of the first set oppose one another across a gap.

2. A head according to claim 1, wherein:
said substrate comprises a garnet and said magneto-optic material is epitaxial with said garnet.

3. A head according to claim 1, wherein:
the two pole pieces of the first pair are thickest in regions where they are closest to one another.

4. A head according to claim 3, further comprising:
non-magnetic material in contact with each pole piece so that a thickness in a direction which is perpendicular to said first major flat surface, of each pole piece plus said non-magnetic material in contact with that pole piece, is constant.

5. A head according to claim 1, wherein at least one of the pole pieces extends in directions parallel to the first major flat surface so as to form an isosceles triangle in a plane parallel to said first major flat surface.

6. A head according to claim 1, wherein:

at least one of the pole pieces extends in directions parallel to the first major flat surface so as to have a substantially sinusoidal contour in a plane parallel to said first major flat surface.

7. A head according to claim 1, wherein:
at least one of the pole pieces has a triangular shape in a plane parallel to the first major flat surface, and regions between air gaps defined by opposing pole pieces of the head form a jagged line.

8. A head according to claim 1, wherein:
said magneto-optic transducer material has only a single magnetic domain in the region opposing at least one of the pole pieces, and the magneto-optic transducer material has oblique anisotropy.

9. A high resolution magneto-optic read head, comprising:
a substrate comprising a magneto-optic transducer material having non-parallel first and second major flat surfaces;
a first pole piece disposed on the first major flat surface; and
a second pole piece disposed on the second major flat surface, wherein a first edge of the first pole piece opposes a second edge of the second pole piece across a gap, wherein the first pole piece and second pole piece comprise magnetic material.

10. A head according to claim 9, wherein:
regions of the first and second pole pieces which are closer to the gap are thinner than regions of the first and second pole pieces which are further from the gap; and
further comprising non-magnetic material disposed on the first and second pole pieces so that a thickness of the non-magnetic material and first pole piece, in a direction perpendicular to the first major flat surface, is constant, and a thickness of the non-magnetic material and second pole piece, in a direction perpendicular to the second major flat surface, is constant.

11. A method of reading a magneto-optic read head, comprising the steps of:
projecting a beam towards at least one pole piece of a pair of pole pieces comprising magnetic material which are opposed to one another across a gap and which are disposed on separate regions of a flat surface of a magneto-optic transducer material, said flat surface being substantially parallel to a magnetic media; and
detecting the intensity of light reflected from the magneto-optic transducer material of the head.

12. A method according to claim 11, further comprising the step of projecting said beam towards the other pole piece of the pair of pole pieces disposed on the magneto-optic transducer material.

13. A process according to claim 11, wherein:
the magneto-optic transducer material has oblique anisotropy and has only a single magnetic domain over at least one of the pole pieces disposed thereon.

14. A method according to claim 11, further comprising the step of polarizing said beam.

* * * * *